United States Patent
Venkatasamy et al.

(10) Patent No.: US 10,283,975 B1
(45) Date of Patent: May 7, 2019

(54) SMART DIAGNOSTICS FOR HOT-PLUGGABLE BATTERY SYSTEMS

(71) Applicant: Amazon Technologies, Inc., Seattle, WA (US)

(72) Inventors: Vidhyananth Ramasamy Venkatasamy, Sunnyvale, CA (US); Thomas Gang Wang, San Jose, CA (US); Xin Li, Sunnyvale, CA (US); Puneet Gupta, San Jose, CA (US); David Wang, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 161 days.

(21) Appl. No.: 15/082,875

(22) Filed: Mar. 28, 2016

(51) Int. Cl.
*H02J 7/00* (2006.01)

(52) U.S. Cl.
CPC .......... *H02J 7/0021* (2013.01); *H02J 7/0026* (2013.01); *H02J 7/0052* (2013.01); *H02J 2007/0001* (2013.01); *H02J 2007/0096* (2013.01)

(58) Field of Classification Search
CPC ...... H02J 7/0045; H02J 7/0021; H02J 7/0026; H02J 2007/0062; H02J 7/0052; H02J 7/0054; H02J 2007/00; H02J 2007/0096; H02J 7/0047; H02J 2007/005; H02J 50/80; H02J 7/0055; H02J 2007/0067
See application file for complete search history.

(56) References Cited

U.S. PATENT DOCUMENTS

| | | | | |
|---|---|---|---|---|
| 5,867,797 A * | 2/1999 | Hashimoto | ........... | H01M 10/44 320/114 |
| 5,914,585 A * | 6/1999 | Grabon | .................... | G06F 1/163 307/29 |
| 6,950,320 B2 * | 9/2005 | Shin | ...................... | H02J 7/0045 320/106 |
| 7,166,987 B2 * | 1/2007 | Lee | ........................... | A45F 5/00 320/114 |
| 7,336,978 B2 | 2/2008 | Kim | | |
| 7,413,129 B2 | 8/2008 | Fruhauf | | |
| 7,863,856 B2 * | 1/2011 | Sherman | ............... | G06F 1/1626 320/103 |
| 7,893,657 B2 | 2/2011 | Chavakula | | |
| 8,180,947 B2 | 3/2012 | Hesse et al. | | |
| 8,253,373 B2 * | 8/2012 | Manor | .................. | H02J 7/0054 320/107 |

(Continued)

OTHER PUBLICATIONS

Simpson, "LM2576, LM3420, LP2951, LP2952 Battery Charging", Texas Instruments, Literature No. SNVAZ557, 19 pages, (2011).

(Continued)

*Primary Examiner* — Helen Rossoshek
(74) *Attorney, Agent, or Firm* — Pierce Atwood LLP (57) ABSTRACT

A modular recharging system includes an electronic device that performs diagnostics on a removable battery pack that the electronic device can use to boost the power of its internal battery. Typically, the battery pack will have a larger battery than the internal battery of the device. The electronic device determines whether the battery pack will take a charge before determining whether the battery pack is authorized to assure that an authorization failure is not due to other issues such as a dead battery, an underpowered battery, or a broken connection between devices.

10 Claims, 4 Drawing Sheets

(56) References Cited

U.S. PATENT DOCUMENTS

| | | | | |
|---|---|---|---|---|
| 8,350,522 | B2* | 1/2013 | Johnson | G06F 1/266 |
| | | | | 320/107 |
| 8,415,923 | B2* | 4/2013 | Forsythe | H02J 7/0008 |
| | | | | 320/110 |
| 8,446,251 | B2* | 5/2013 | Kozuma | H02J 5/005 |
| | | | | 340/5.61 |
| 8,610,397 | B2 | 12/2013 | Purdy et al. | |
| 8,627,121 | B2 | 1/2014 | Wu | |
| 8,686,688 | B2* | 4/2014 | Han | G06F 13/4068 |
| | | | | 320/111 |
| 8,736,228 | B1* | 5/2014 | Freed | H02J 7/0044 |
| | | | | 320/115 |
| 8,738,952 | B1* | 5/2014 | Lachwani | G06F 1/3287 |
| | | | | 710/100 |
| 9,417,677 | B2* | 8/2016 | Gray | G06F 1/28 |
| 9,509,020 | B1* | 11/2016 | Wang | H01M 10/48 |
| 9,602,983 | B1* | 3/2017 | Rahman | H04W 4/12 |
| 9,812,878 | B1* | 11/2017 | Stieber | H02J 7/0021 |
| 2005/0278228 | A1* | 12/2005 | Schultz | G06Q 30/06 |
| | | | | 705/26.35 |
| 2007/0214296 | A1* | 9/2007 | Takamatsu | H02J 7/0004 |
| | | | | 710/63 |
| 2009/0128346 | A1* | 5/2009 | Zhao | G08B 21/24 |
| | | | | 340/636.15 |
| 2011/0221604 | A1* | 9/2011 | Johnson | G06F 1/266 |
| | | | | 340/664 |
| 2011/0273137 | A1* | 11/2011 | Nakatsuji | H01M 2/34 |
| | | | | 320/107 |
| 2012/0200265 | A1* | 8/2012 | Fukasawa | H02J 7/0036 |
| | | | | 320/137 |
| 2012/0319487 | A1 | 12/2012 | Shah | |
| 2013/0020875 | A1* | 1/2013 | Wozniak | H01M 10/46 |
| | | | | 307/72 |
| 2013/0043827 | A1* | 2/2013 | Weinstein | H02J 7/0027 |
| | | | | 320/103 |
| 2013/0057068 | A1 | 3/2013 | Lin | |
| 2013/0119922 | A1* | 5/2013 | Chen | H02J 7/0021 |
| | | | | 320/107 |
| 2013/0207455 | A1* | 8/2013 | Doljack | H02J 7/0036 |
| | | | | 307/9.1 |
| 2014/0070774 | A1* | 3/2014 | Terlizzi | H02J 7/0004 |
| | | | | 320/162 |
| 2015/0188346 | A1* | 7/2015 | Oku | H02J 7/0029 |
| | | | | 320/107 |
| 2015/0270733 | A1* | 9/2015 | Inha | H02J 7/0054 |
| | | | | 320/103 |
| 2015/0326046 | A1* | 11/2015 | Song | H02J 7/0052 |
| | | | | 320/107 |
| 2015/0349572 | A1* | 12/2015 | McCoy | H02J 7/025 |
| | | | | 320/103 |
| 2016/0026551 | A1* | 1/2016 | Kim | G06F 11/3051 |
| | | | | 713/340 |
| 2016/0056651 | A1* | 2/2016 | Von Novak, III | H02J 7/0044 |
| | | | | 320/114 |
| 2016/0064979 | A1* | 3/2016 | Huang | H02J 7/0055 |
| | | | | 320/114 |
| 2016/0219664 | A1* | 7/2016 | Ellenberger | H05B 33/0842 |
| 2016/0266214 | A1* | 9/2016 | Nomura | G01R 33/0023 |
| 2017/0179771 | A1* | 6/2017 | Leabman | H02J 50/15 |

OTHER PUBLICATIONS

Taylor et al., "Creating a Universal Car Charger for USB Devices From the TPS54240 and TPS2511", Texas Instruments Application Report, SLVA464E, pp. 1-22, (Sep. 2013).

"Battery chargers in USB OTG devices", Texas Instruments, Literature No. SSZY001, 6 pages, (Jun. 2010).

"USB On-the-Go Basics", Maxim Integrated Products, Inc., Tutorial 1822, Available at: http://www.maximintegrated.com/an1822, 6 pages, (2012).

* cited by examiner

SMART DIAGNOSTICS FOR HOT-PLUGGABLE BATTERY SYSTEMS

BACKGROUND

Electronic devices, such as e-book readers and smartphones are constrained by the capacity of their batteries, requiring recharge after some period of usage. Increasing the capacity of these batteries to extend battery life increases the mass of the device, which in many circumstances is undesirable.

To recharge the device's battery without connecting to the power grid, solutions exist where the device is connected to an external battery pack, such as device "case" that includes a secondary battery, or battery pack that connects to the device by a Universal Serial Bus (USB) connector. However, these cases and other external battery packs can be improved. Described herein are technical solutions to improve the use of these and other types of devices.

BRIEF DESCRIPTION OF DRAWINGS

For a more complete understanding of the present disclosure, reference is now made to the following description taken in conjunction with the accompanying drawings.

DETAILED DESCRIPTION

A system is disclosed where a device with a primary battery can be connected to and charge from an external secondary battery. The device may connect to the external battery via, for example, a pogo pin interface, cable, or other connection. The external battery is hot-pluggable, such that flow control diagnostics are performed then the devices are initially connected to detect errors and segregate error scenarios. Among other things, the device may differentiate between communication errors due to a dead external battery, errors due to the external battery being low on charge, errors due to a damaged interface (e.g., a damaged pogo pin), and that whether the external battery is or is not docked with the device.

If an error is detected, the device can provide prompt and appropriate notifications to a device user, helping to reduce premature customer service contacts, since the user may be able to remedy the problem themselves once the problem is explained to them. For example, when faced with a dead external battery (fully depleted) or an external battery which has a charge below a useable threshold, the user can be instructed to connect a charger, if not connected already. A determination can be made as to whether the external battery is able to take a charge before determining whether the external battery does meets safety and compliance requirements based on whether an identifier ("ID") of the external battery matches an approved ID. Verifying that the external battery is able to take a charge prior to authenticating that the external battery is licensed/correct helps minimize incorrect notifications to the user that the battery is unauthorized, when in actuality the data conveying the battery's identifier is corrupted for some reason (e.g., weak charge, broken mechanical interface), and the external battery is actually compliant.

Figure 1:
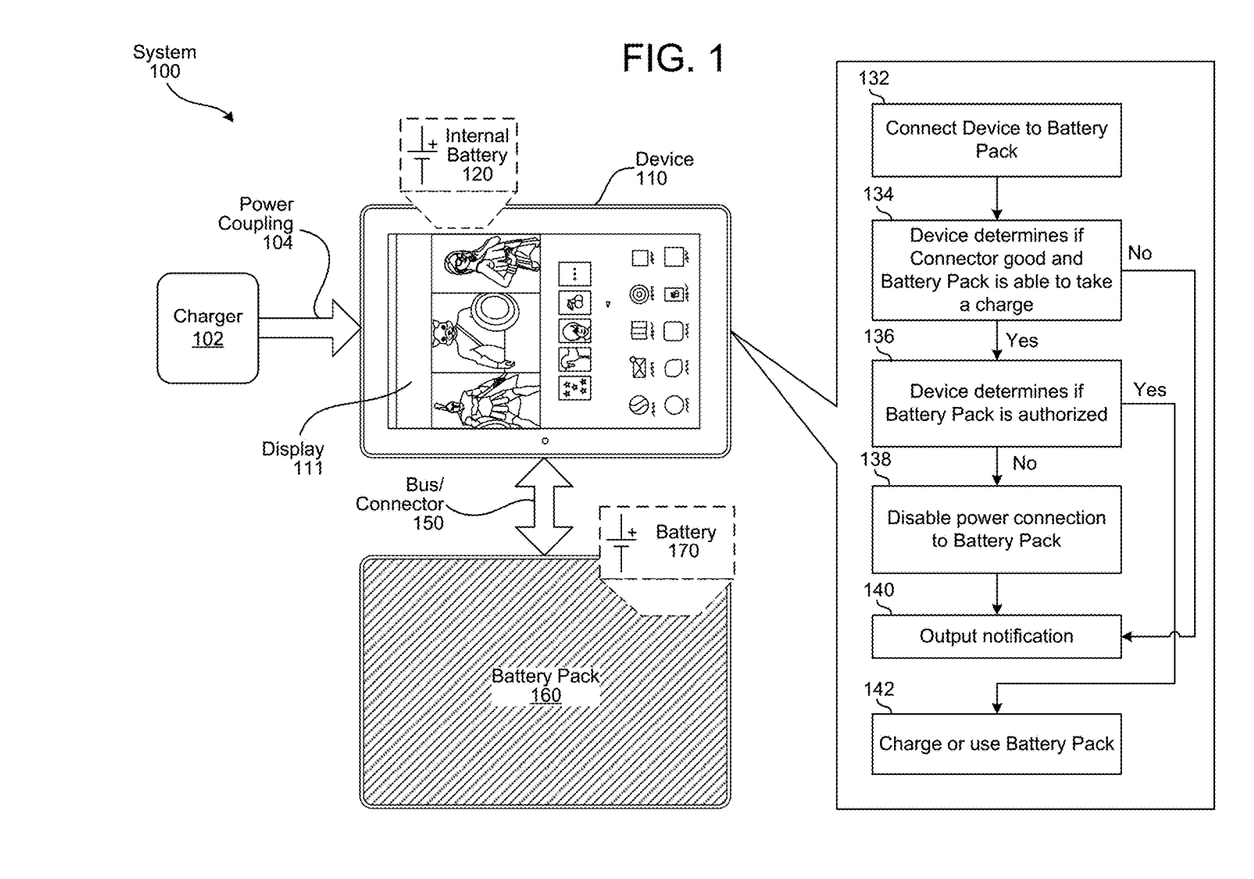
FIG. 1 illustrates a modular charging system for a device that includes a secondary battery in addition to the battery within the device, where the device performs diagnostics on the battery pack.

FIG. 1 illustrates a modular charging system 100 for a device 110 that is connected to a hot-pluggable battery pack 160 including a battery 170 that supplements the internal battery 120 within the device 110. The battery 170 within the battery pack 160 may be, for example, be a larger battery that is capable of holding a larger charge than the battery 120 within the device 110. The device 110 electrically connects (132) to the battery pack 160 via a bus and/or connector 150.

A challenge with hot-pluggable batteries is differentiating between different data "events" that may occur when the battery pack 160 is plugged in, such as differentiating between the battery 170 being dead, being low on power, or being damaged. For example, damage to pins/wires of the bus/connector 150 connecting the device 110 to the battery pack 160 may sometimes be indistinguishable from a dead battery, since data or signals expected by the device 110 may not be received from the hot-pluggable battery pack in either case. Without knowing the correct cause of an error, the device 110 would be unable to notify a user of what corrective course of action to take. "Hot-pluggable" means the battery pack 160 may be connected and disconnected from the device 110 without shutting down the device 110.

Additionally, it can be advantageous to reduce the amount of processing power in the battery pack 160, using the processor in the device 110 to perform diagnostics. Among other advantages, localizing the diagnostics in the device can facilitate reducing the monetary cost of the battery pack 160, reduces a layer of complexity and potential fault (a secondary processor), and makes it easier to update the diagnostic routines over time (since the device 110 will typically be a network-connected device, whereas a user might infrequently connect the battery pack 160 to the network-connected device).

The device 110 detects (132) when the battery pack 160 is connected, and determines 134 if the battery is able to take a charge. As will be described further below, diagnostics are performed to determine (134) if the battery 170 is able to take a charge, and whether the bus/connector 150 is functioning properly, allowing the device 110 to distinguish between communication errors due to the battery 170 being dead, being low (e.g., too weak to provide valid data to the device 110), or failing to communicate due to damage to the bus/connector 150. The device 110 also detects if the battery pack 160 is undocked.

In response to a communication error with the battery pack 160 (134 No), the device 110 outputs (140) a notification for a device user indicating the source of the fault so that the user may take appropriate corrective action. The notifications are output via a user interface, such as display 111. The device's ability to pin-point the fault may reduce premature customer service contacts by the user in response to the battery pack 160 working incorrectly, and speed up the ability of the user to fix the problem.

In response to the device 110 determining (134 Yes) that the battery pack is able to take a charge and the bus/connector is functioning correctly, the device determines (136) whether the battery pack is authorized. Authorization may be used to determine, among other things, whether the battery pack meets safety and compliance requirements, and/or is licensed. If the battery pack is not authorized (136 No), the device 110 disables (138) the power connection to the battery pack and outputs (140) a notification. Otherwise (136 Yes) the device 110 charges and/or uses (142) electrical energy from the battery pack 160.

Among the notifications (140) that may be output as part of the battery pack diagnostics and monitoring routine are that the battery 170 is dead, that the charge on the battery 170 is too low/weak to be used to charge the device 110, that the battery pack 160 is not valid/authorized, that there are mechanical connectivity issues with the bus/connector 150, and that the battery pack 160 has been undocked/disconnected from the device 110 during active communication. The notification that the battery 170 is low/weak may include an instruction to connect the device 110 to a power charger 102 via power coupling 104 so that the battery pack may be recharged.

Figure 2:
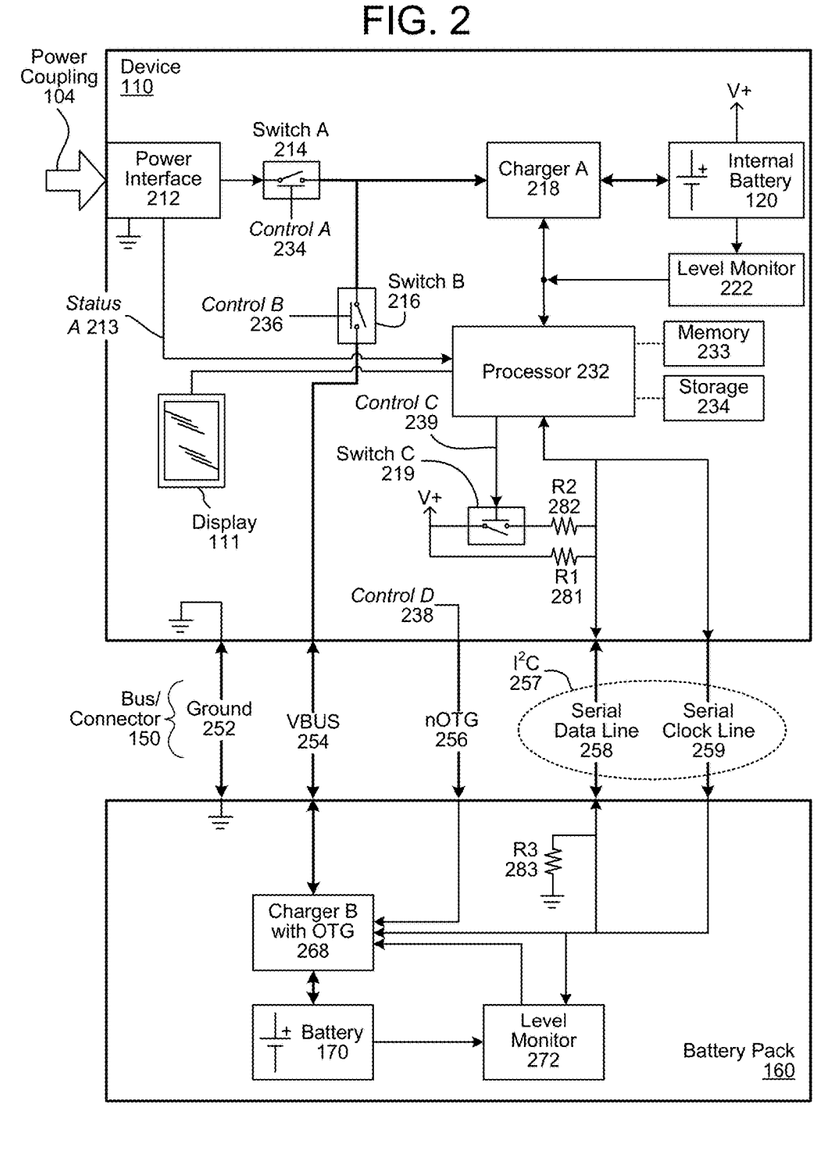
FIG. 2 is a block diagram conceptually illustrating example components of the modular system.

FIG. 2 is a block diagram conceptually illustrating example components of the modular system. The common communication channel between the device 110 and the battery pack 160 is an I²C bus 257 which includes a serial data pin/line (SDA) 258 and a serial clock pin/line (SCL) 259. Other pins/lines that may be included in the bus/connector 150 between the device 110 and the battery pack 160 include ground 252, VBUS (power) 254, and nOTG 256 (n-"On-The-Go," a USB-protocol power control signal line/pin).

The device 110 and the battery pack 160 include several components that may be conventional features of device charging systems. For example, the power interface 212 of the device 110 may be of any design, and transfers electrical energy received via the power coupling 104 (e.g., wired, inductive) into the device 110. Another example of a component that may be conventional is the Charger A 218 and the level monitor 222, which may be included in a same power management integrated circuit (PMIC). The Charger A 218 is a charger circuit that charges the internal battery 120 using electrical energy received at its input. The level monitor 222 determines a charge level of the internal battery 120 (e.g., "State of Charge" (SOC), output voltage), and is sometimes referred to as a "fuel gauge." SOC may be represented, among other ways, as a percentage, where zero percent corresponds to a fully-drained battery and one hundred percent corresponds to a fully-charged battery. The level monitor 222 may provide the charger circuit 218 with an indication of the internal battery's charge level, which the Charger A 218 may use to control the rate at which electrical energy is applied to the internal battery 120. As known in the art, the level monitor 222 may use any suitable SOC measurement/estimation technique or combination of techniques, such as voltage-based estimation, current-based estimation (e.g., Coulomb counting), impedance measurement, etc. The level monitor 222 may provide software-programmable threshold charge and/or voltage level detection, which may be output (among other ways) as hardware interrupt signals to the device's processor 232. Such interrupts are conventionally used to support device services such as low battery warnings.

The processor 232 of the device 110 may obtain data from the battery pack 160 via the I²C serial bus 257. Among other things, via the serial interface, the processor 232 of the device 110 may acquire status information from the battery pack's Charger B 268 and/or a level monitor 272. Charger B 268 is a charger circuit that operates in a variety of modes, including a charge mode in which it charges the battery 170 using electrical energy received at the connector 150, and a "boost" mode in which it outputs electrical energy from the battery 170 to the connector 150. The level monitor 272 may operate in a same or similar to level monitor 222, as discussed above. The processor 232 may also perform other operations, such as setting threshold levels for charge/voltage level-based signaling (e.g., interrupts) and receiving such level-based signaling. The Charger B 268 and the level monitor 272 may be separate components, or part of an integrated PMIC.

Operations of the system 100 are orchestrated by the processor 232. The processor 232 executes instructions and retrieves data stored in a storage element 234 and/or memory 233. The storage element 234 may include one or more different types of memory, data storage or computer-readable storage media, such as, for example, a first data storage for program instructions for execution by the processor 232, and a second data storage for images or data, and/or a removable storage for transferring data to other devices. The storage element 234 may store software for execution by the processor 232 such as, for example, operating system software and user applications.

The device 110 may include an internal device battery 120, and the Charger A 218 and level monitor 222 which are used to control the recharging of the device battery 120. The device battery 120 may comprise any type of rechargeable battery suitable for use with the device's intended application, such as, for example nickel metal hydride (NiMH), lithium ion (Li-ion), lithium air, or lithium ion polymer (Li-ion polymer) batteries.

An external power supply 102 may be coupled to a power interface 212, such as a USB interface or inductive charging interface to supply electrical energy to the device 110, and under the direction of the processor 232, to supply electrical energy to the battery pack 160. The processor 232 may control various solid-state switches, such as controlling switch A 214 using control A signal 234, controlling switch B 216 using control B signal 236, and control D signal 238 to set a state of the nOTG line 256. Based on the states set for control signals A, B, and D, the processor 232 directs electrical energy from the power coupling 104 to Charger A 218 and to Charger B 268, and from Charger B 268 to Charger A 218.

The battery pack 160 includes a battery 170 and a charging/sourcing circuit 160 (referred to herein as Charger B 268). Charger B 268 may support, among other things, "On-The-Go" as provided in the USB specification. "On-The-Go" supports communications between hot-pluggable devices, such as communication via the power control line (nOTG 256) and via the I²C bus 257. The Charger B 268 is configured to operate the battery pack 160 in a boost (sourcing) mode in which electrical energy is supplied by battery 170 to the device 110 for recharging device battery 120 or directly powering the device 110, a charge mode in which electrical energy is received via the VBUS 254 to recharge the battery 170 (e.g., an active state charge mode), and a stand-by mode in which the charging circuit 160 is waiting to receive electrical energy via the VBUS 254. The Charger B 268 may further operate in a disconnect mode in which the battery 170 is electrically disconnected from VBUS 254 to prevent any voltage/current from leaking across the VBUS 254.

When the electronic device 110 is connected to the battery pack 160, to configure the system 100 for "boost" mode, the processor 232 will set the control B signal 236 to close switch B 216, and set the control D signal 238 to pull the nOTG control line 256 low, causing the Charger B 268 to connect the battery 170 to the power bus (VBUS line 254), so as to output electrical energy (e.g., a 5 V potential relative to the ground line 252) from the battery 170 via the power bus (VBUS 254) to recharge the device battery 120.

If there is a power supply 102 (shown in FIG. 1) connected to the power interface 212 of the device 110, the processor 232 will close switch A 214, allowing electrical energy to flow to the Charger A 218. To operate the system 100 in a charge mode, the processor 232 will pull the control D signal 238 high and close switch B 216, causing a portion of the electrical energy received via the power interface 212 to be directed to the battery pack 160, and causing the Charger B 268 to charge the battery 170 using that portion of electrical energy.

The I²C interface 257 between the device 110 and the battery pack 160 may include two bidirectional 'open-drain' lines 258, 259, meaning that they can pull the corresponding signal line low, but cannot drive it high. Thus, there can be no bus contention where one device is trying to drive the line high while another tries to pull it low, eliminating the potential for damage to the drivers or excessive power dissipation in the system. The two lines may include the serial data line (SDA) 258 and a serial clock line (SCL) 259. The SDA line 258 may be connected to a positive voltage source via a "pull-up" resistor so as to pull up the voltage on the SDA line 258, restoring the signal on the SDA line 258 to high when no device is asserting it low. Similarly, SCL line 259 may have a pull-up resistor on it to restore the signal to high when no device is asserting it low. The pull-up resistors are connected to a positive voltage source, such as the V+ voltage potential of the internal battery 120 in the device 110, although a different voltage source may be used.

The SDA line 258 may be multiplexed between a "data" mode used to exchange data between devices 110 and 160, and an "interrupt" mode used to generate an interrupt for the processor 232 when the device 110 is connected to the battery pack 160. To "pull-up" the potential on the SDA line 258, the device 110 may include a first resistor R1 281 that is coupled between the SDA line 258 and a positive voltage source, such as V+ from the internal battery 120. The device 110 may also include a second resistor R2 282 that is coupled between a switch C 219 and the SDA line 258. The switch C 219 connects and disconnects the second resistor R2 282 to the positive voltage source (e.g., V+) in accordance with a control C signal 239 output by the processor 232. The first resistor R1 281 has a higher resistance than the second resistor R2 282. The battery pack 160 may include a third resistor R3 283 that couples the SDA line 258 to a voltage potential that is less than that of the positive voltage source, such as the zero volt ground potential (i.e., the ground line 252). The third resistor R3 283 may have a higher resistance than the second resistor R2 282 but lower than the first resistor R1 281.

When the battery pack 160 is connected to the device 110, the processor 232 receives an interrupt signal based on the SDA line 258 being pulled down by the third resistor R3 283. As will be described further below, in response to the interrupt, the processor 232 may toggle operation of the I²C bus 257 between the interrupt mode and a data mode used to transfer data between the device 110 and the battery pack 160. This multiplexing "toggle" maybe controlled by the processor 232 using the control C signal 239 to open and close the switch C 219. When the switch C 219 is closed, the second resistor R2 282 is connected to the positive voltage to pull up the SDA line 258 from the logic low voltage (held low by the third resistor R3 283) to a logic high voltage, thus transitioning the SDA line 258 to data mode operation. After the data communication finishes, the processor 232 may open switch C 219 and put the I²C bus 257 back into interrupt mode. When the battery pack 160 has been disconnected from the device 110, the processor 232 receives a signal as the SDA line 258 transitions from the logic low level (held down by the third resistor R3 283) to the logic high level due to disconnection of R3, generating a processor interrupt. Although the example in FIG. 2 uses a two-wire I²C bus 257, the operational principles discussed in connection with multiplexing the SDA line 258 may be used with other bus configurations, such as single wire serial bus.

Figure 3:
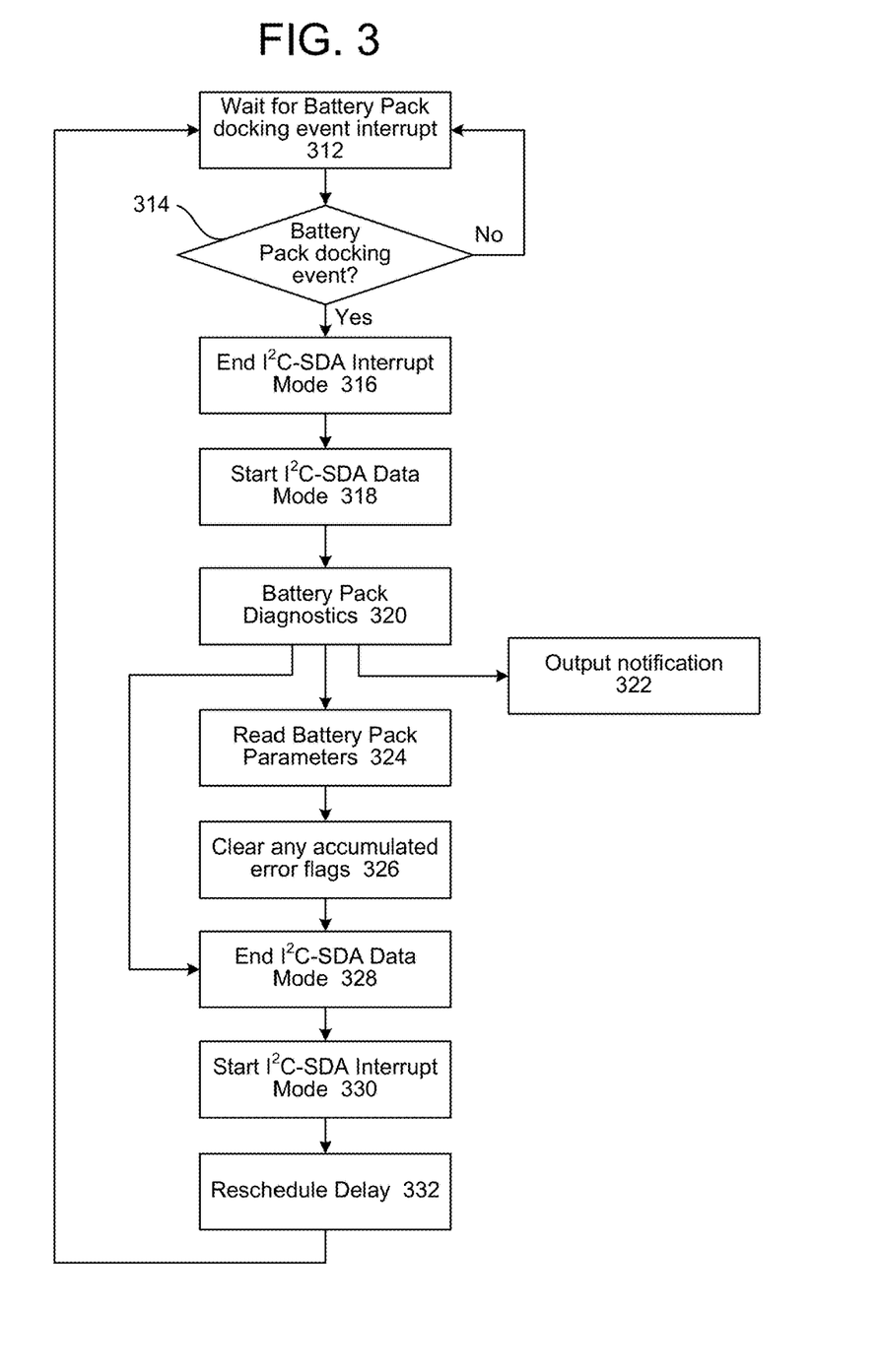
FIG. 3 is a flow diagram of operations performed by the device to monitor the plugging-in and status of the battery pack.
Figure 4:
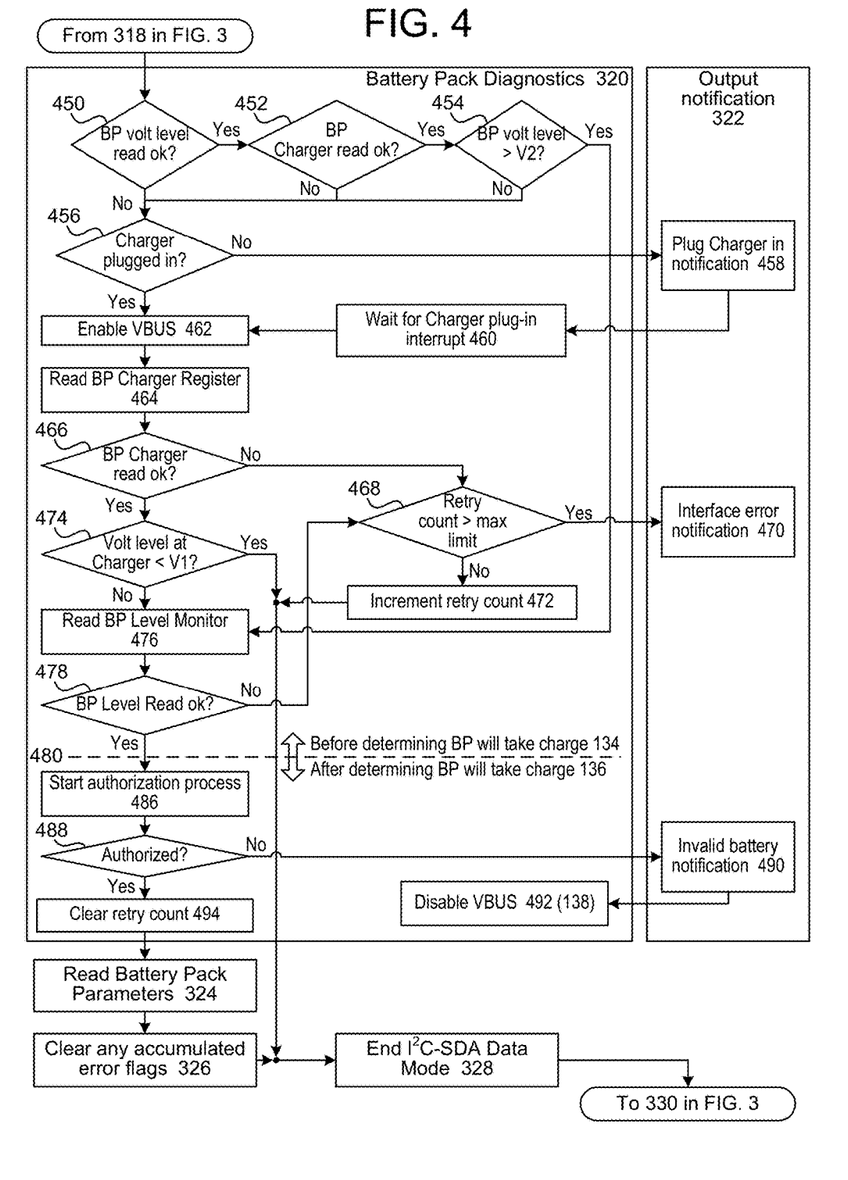
FIG. 4 is a flow diagram of the diagnostic routine performed by the device of the battery pack as part of the operations in FIG. 3.

Operations in FIGS. 3 and 4 are detailed examples of the operations 134 to 140 in FIG. 1. FIG. 3 is a flow diagram of operations performed by the device 110 to monitor the plugging-in and status of the battery pack 160. The device 110 waits (312) for a battery pack docking event interrupt 312 generated in response to the third resistor R3 283 pulling down the serial data line 258 when the battery pack 160 is connected (i.e., 132 in FIG. 1). In response to the battery pack docking event (314 Yes), the processor 232 ends (316) I²C-SDA interrupt mode, and starts (318) the I²C-SDA data mode that closes/pulses switch C 219 to transmit serial data via the SDA line 258. Based in part on querying and/or receiving data from various status/data registers on the battery pack 160 via the I²C SDA line 258, the processor/controller 232 performs (320) diagnostics on the battery pack.

As will be described in connection with FIG. 4 below, the battery pack diagnostics 320 may result in the outputting (140/322) of a notification via a user interface (e.g., displaying a message on a display 111 of the device 110 for a user), returning to monitor the plug-in status of the battery pack 160, and/or reading parameters 324 of the battery pack 160 to facilitate using the battery 170 to charge the internal battery 120 and/or to charge the battery 170 using electrical energy from the power charger 102. Examples of battery pack parameters include data stored in registers in-or-by Charger B 268, level monitor 272, or a combination thereof, include voltage (e.g., level in millivolts), current (e.g., in milliamps), temperature (e.g., degrees Celsius), last measured charge (LMD in milliamp hours), nominal available charge (NAC in milliamp hours), and State of Charge (SoC in percentage). After the battery pack parameters are read, the processor 232 may clear (326) any accumulated error flags relating to the monitoring and management of the battery pack 160.

After diagnostics (320) are complete, and after the battery pack parameters are read (324, if performed), the processor ends (328) I²C-SDA data mode, opening switch C 219, and starting I²C-SDA interrupt mode 330, in which a processor interrupt will be generated if the SDA line 258 is pulled high in response to the battery pack 160 being disconnected. A preconfigured delay (332) may be imposed before the process loops back to checking for battery pack docking events (312/314).

FIG. 4 is a flow diagram of the diagnostic routine 320 performed by the device of the battery pack as part of the operations in FIG. 3. Via the SDA line 258, the processor/controller 232 is configured to attempt to read the voltage level on the battery 170 by accessing a register of the level monitor 272. If a level is successfully read (450 Yes), the processor/controller 232 is configured to check a register of the battery Charger B 268 that is used to determine whether the Charger B 268 is operational. This may be a specific register, but any register may be used, as a purpose of this check is to determine whether the I²C bus 257 link to the Charger B 268 is operational. If the battery Charger B 268 is operational (452 Yes), the processor/controller 232 determines if the battery voltage level that was read in greater than a threshold V2 (454 Yes) (e.g., 3.2 volts). If the battery voltage level is greater than the threshold V2 (454 Yes), then the battery 170 is determined to have sufficient charge to conduct further diagnostics, and the process jumps to reading (476) data from the level monitor 272.

The Charger B 268 and level monitor 272 may require different minimum voltage levels in order to operate. If the Charger B 268 or level monitor 272 are powered at voltage levels below their minimum operating voltages, data included in their registers may be corrupt or inaccurate, such that data provided to the processor 232 by device 160 may be invalid, if any data is even provided. For example, the level monitor 272 may require at least 2.4 V to operate, whereas the Charger B 268 may require at least 2.7 V to operate. Typically, the level monitor 272 will be operational at a lower voltage than the Charger B 268 needs to operate. The threshold V2 is set to be a "safe" minimum operation voltage for both the Charger B 268 and the level monitor 272, such that V2 is greater than or equal to the larger of the minimum operational voltages of the Charger B 268 (e.g., 2.7 V) and the level monitor 272 (e.g., 2.4 V).

Otherwise, if the voltage level reading was unsuccessful (450 No), the battery Charger B 268 did not indicate that it is operational (452 No), or the voltage level of the battery 170 was equal-to-or-less-than the threshold V2 (454 No), then a determination (456) is made as to whether the power charger 102 is plugged-in and coupled to the device 110, since the battery pack 160 may be dead or may have too weak a charge to be useful as a charging source for boosting the charge on battery 120.

If the power charger 102 is not plugged-in and coupled to the device (456 No), the processor 232 outputs (458) a notification via the user interface (e.g., display 111) for the user to plug the power charger 102 in and connect/couple it to the device 110. The device 110 then waits for power to be received from the power charger 102 and output by power interface 212 as electrical energy. After power is received by power interface 212 and output as electrical energy (either after waiting 460 or in response to the determination 456 being Yes), the processor/controller 232 enables (462) the VBUS line 254 by closing switch B 216.

After enabling the VBUS line 254, which should supply electrical energy to the battery pack 160 if the battery pack is operating correctly, the processor/controller 232 again tries to read a register of the Charger B 268 via the SDA line 258 to determine whether the Charger B 268 indicates that it is operational. The register may be a specific register of the Charger B 268, or may be an arbitrary register, as the purpose of the read (464) is to determine that the Charger B 268 is now receiving power from the VBUS 254, and is communicably coupled to the processor/controller 232 If the read from the register of Charger B does not validate that the Charger B is connected and is operating normally (466 No), the processor/controller 232 checks (468) the number of times it has unsuccessfully retried reading a register in the battery pack 160. If the read retry count exceeds a maximum limit, the processor outputs (470) a notification via the user interface for the user indicating that there is an interface error, such as a mechanical fault in the bus/connector 150. Otherwise, if the retry count has not exceeded the maximum limit (468 No), the processor/controller 232 increments (472) increments the retry count and jumps to the step of ending (328) the I²C-SDA data mode in FIG. 3, leading to the loop in FIG. 3 repeating.

Absent a fault or error, after power from the power charger 102 is applied to the battery pack 160 as electrical energy via VBUS 254, the processor/controller 232 should be able to read the register of Charger B (466 Yes). The processor/controller 232 then checks a register of the Charger B 268 that indicates the voltage level of the battery 170 as determined by the Charger B. The Charger B may determine the voltage level of the battery 170 based on the level monitor 272, or independently but with less granularity and/or accuracy than that of the level monitor 272. The processor/controller then determines 474 whether the reported voltage level is below a threshold voltage V1. In the alternative, the Charger B may perform the comparison of the voltage level with the threshold voltage V1 and provide the processor/controller 232 an indication as to whether the battery 170 is at a voltage level that less than a threshold voltage V1 low. At this point, the Charge B is receiving electrical energy from the VBUS 254, and should be able to operate even if the battery 170 is at a voltage below the operational minimum for the Charger B 268. The threshold voltage V1 may correspond to the minimum operational voltage of the level monitor 272 (e.g., 2.4 V). The register of Charger B 268 that is read (464) to determine that the charger 268 and interface 150 are operating properly may be the same register read to determine (474) the voltage level, or different register reads may be used to support the determination 466 and the determination 474.

In combination with determining that the voltage level at the Charger B 268 is above the threshold voltage V2 (454), the determination (474) as to whether the voltage level at Charger B 268 is below the threshold voltage V1 results in an voltage range between thresholds V1 and V2, such as between 2.4 and 3.2 volts. If the voltage output by the battery 170 is above the threshold V2 (454 Yes), then the battery 170 is holding a charge and is able to independently (i.e., independent of power from VBUS 254) power operation of both the Charger B 268 and the level monitor 272. If the battery is low (474 Yes), it is too soon to determine whether the battery 170 will take a charge, since the battery 170 is too low to independently power the Charger B 268, absent power from the VBUS 254. In this case, the processor/controller 232 jumps to the step of ending (328) the I²C-SDA data mode in FIG. 3, leading to the loop in FIG. 3 repeating (allowing the battery 170 time to take a charge).

If the processor/controller 232 determines that the battery is not below the threshold voltage V1 (474 No), the processor/controller 232 next reads (476) data from a register of the level monitor 272 to determine the level monitor 272 is operating normally or whether there is an error. Any register may be used, but typically it will be a register indicating the voltage level of the battery 170. The processor/controller 232 determines (478) whether the result of the read of the register of level monitor 272 does or does not indicate normal operation. The processor/controller 232 may determine that the result does not indicate normal operation (478 No), for among other reasons, if no data is received as a result of the read, if the voltage level value represented by the received data is above an upper voltage limit for battery packs (likely indicating that the received data is invalid), or if the voltage level read (476) from the level monitor 272 differs from the level read (e.g., 464) from the Charger B 268 by more than a specified amount (likely indicating that the data received in response to one or more of the reads is/was invalid).

If the processor/controller 232 determines that the data read (476) from the register of the level monitor 272 is invalid or non-existent (478 No), the process checks (468) whether the retry count exceeds the maximum limit. If the retry count exceeds the maximum limit (468 Yes), the processor/controller 232 outputs the interface error 470. Otherwise, if the retry count has not been exceeded (468

No), the processor/controller 232 increments (472) increments the retry count and jumps to step 328 in FIG. 3.

If instead, the processor/controller 232 determines that the data received from the level monitor 272 indicates that operations are normal (478 Yes), the processor/controller 232 has resolved that the battery pack will take a charge. This resolution is illustrated in FIG. 4 by dotted line 480, where steps within routine 320 above the line 480 occur before the processor/controller 232 has resolved whether the battery 170 will take a charge and that the connector 150 is good (i.e., step 134 in FIG. 1), and steps within routine 320 below the line 480 occur after the processor/controller 232 has resolved that the battery 170 will take a charge and that the connector 150 is good (i.e., step 136 in FIG. 1). Otherwise, if the resolution represented by line 480 is not reached, the diagnostics process 320 is exited/ended either by the outputting (322) of a notification or jumping back into the loop illustrated in FIG. 3 (e.g., jumping to step 328) without authorizing (486/488) the battery pack 160.

Once it is resolved that the battery 170 will take a charge, the processor/controller 232 starts (486) the authorization process, such as by reading a register on the battery pack 160 indicating a serial number or other identifier of the battery pack 160, and comparing it to ranges of authorized battery pack serial numbers or list of authorized identifiers. If the battery pack 160 is not authorized for use with the device 110 (488 No), the processor/controller 232 outputs (490) a notification 490 that the battery is invalid, and disables (138/492) the VBUS line 254 by opening switch B 216. If the battery pack is authorized (488 Yes), the processor/controller 232 clears the retry count 494 and advances to reading (324) the battery pack parameters, as discussed above in connection with the process in FIG. 3. The processor/controller 232 may also configure the system 100 for boost mode, charging or using (142) electrical energy from the battery pack 160 to charge the internal battery 120 and/or power the device 110 (e.g., when the charger 102 is decoupled from the device 110).

It is contemplated that principles of operation disclosed in connection with the device 110 and battery pack 160 may apply to a wide variety of device architectures. The device 110 may be any battery powered device, such as a mobile computing device (e.g., smart phone, tablet computer, notebook computer, electronic reader/book, smart-watch, media player, portable gaming device, portable digital assistant, laptop computer, Bluetooth headset, etc.), an electric vehicle (e.g., an electric automobile), or other device that may be powered by its own internal battery 120. The bus/connector 150 may be wired (e.g., via a cable) or a contact-to-contact connection (e.g., a pogo pin interface as might be used when the battery pack 160 is a protective case for the device 110). The battery pack 160 may be a battery pack or most any battery-powered device capable of charging another device and taking a charge through a bus/connector 150. Other components not illustrated in FIG. 2 may be included in the device 110 and the battery pack 160, such as components related to other computing and communication functionality that may be provided by the devices 110/160. The battery pack 160, which includes the battery 170, may be used to provide additional power to the device 110 and/or recharge the device's internal battery 120 (e.g., to provide increased battery life for extended device operation). Optionally, the device 110 and the battery pack 160 may be mechanically fasted together.

The power interface 212 of the device 110 may comprise a power port, such as a Universal Serial Bus (USB) port, which can be connected to an AC power adapter (e.g. Charger 102) to recharge the device's internal battery 120, similar to how conventional e-readers and smartphones are recharged. While the device 110 is connected to the battery pack 160, the power from the device's USB port can also be used to recharge the battery pack's battery 170 at the same time as it is recharging the device's internal battery 120. This can be accomplished without having to disconnect the device 110 from the battery pack 160, and also using a connection to a single power port.

The power coupling 104 may also be wireless. As an example of a wireless arrangement, the power coupling 104 may be inductive, with the power interface 212 including an induction coil that electromagnetically couples to an induction coil of the charger 102, with the power interface 212 converting the electromagnetic energy into electrical energy. As an example of another wireless arrangement, the power coupling 104 may be based on radio frequency (RF) charging, in which case each of the charger 102 and the power interface 212 may each include one or more antennas for transmitting (charger 102) and receiving (power interface 212) RF energy, with the power interface 212 converting received RF energy into electrical energy.

Another example of the electronic device 110 is a charger for an electric automobile, where the battery pack 160 is the battery of an electric automobile. In such an arrangement, the device 110 may optionally omit the internal battery 120, instead relying on the charger 102 for energy. If relying on the charger 102 for energy, then the outcome of step 456 in FIG. 4 will always be "yes," such that 456, 458, and 460 may be omitted from the battery pack diagnostics 320.

The electronic device 110 may include a display component 111 that serves as the user interface for the outputting (140/322) of notifications. The display component 111 may comprise, for example, an electronic paper display. Electronic paper displays represent an array of display technologies that largely mimic the look of ordinary ink on paper and may utilize any of a variety of electronic paper display technologies, such as, e.g., electrophoretic, electrowetting, electrofluidic, interferometric modulator, or the like. Alternatively, the display component 111 may comprise another type of display technology capable of rendering visible images, such as, e.g., cathode ray tubes (CRTs), liquid crystal display (LCD) screens, gas plasma-based flat panel displays, LCD projectors, etc.

The electronic device 110 may include one or more input components (not illustrated) operable to receive inputs from a user. The input components can include, for example, a push button, touch pad, touch sensors integrated with the display 111, wheel, joystick, keyboard, mouse, trackball, keypad, accelerometer, light gun, game controller, or any other such device or element whereby a user can provide inputs to the electronic device 110. These input components may be incorporated into the electronic device 110 or operably coupled to the electronic device 110 via wired or wireless interface. For electronic devices with touch-sensitive displays, the input components may comprise a touch sensor that operates in conjunction with the display component 111 to permit users to interact with the image displayed by the display component 111 using touch inputs (e.g., with a finger or stylus).

The electronic device 110 may also include at least one communication interface comprising one or more wireless components operable to communicate with one or more separate devices within a communication range of the particular wireless protocol used by the interface. The wireless protocol can be any appropriate protocol used to enable devices to communicate wirelessly, such as Bluetooth, cellular, IEEE 802.11 (WiFi), or infrared communications protocols, such as an IrDA-compliant protocol.

The electronic device 110 includes a processor/controller 232 that executes instructions and retrieves data stored in a storage element 234 and/or memory 233. The storage element 234 may include one or more different types of non-volatile memory, data storage or computer-readable storage media, such as, for example, a first data storage for program instructions for execution by the processor 232, a second data storage for images or data, and/or a removable storage for transferring data to other devices. The storage element 234 may store software for execution by the processor/controller 232, such as, for example, operating system software and user applications.

The device 110 may include the internal device battery 120 and a charging control system that controls the recharging of the device battery 120. The charging control system comprises Charger A 218 and Level Monitor 222. The device battery 120 may comprise any type of rechargeable battery suitable for use with the device's intended application, such as, for example nickel metal hydride (NiMH), lithium ion (Li-ion), or lithium ion polymer (Li-ion polymer) batteries.

The devices 110 and 160 further include interfaces of the bus/connector 150. The interface of the device 110 is removably couplable to a corresponding interface of the battery pack 160, to enable both communications and power delivery between the device 110 and the battery pack 160. As illustrated in FIG. 2, the interfaces of the bus/connector 150 may comprise a 5-pin connector including a ground return line (GND) 252, a power bus line 254 (e.g., a VBUS line), a control line 256 (e.g., nOTG), and two lines 258 and 259 utilized for a data bus (e.g., an $I^2C$ bus 257). In other embodiments, the bus/connector interfaces may utilize greater or fewer lines and provide different forms of functionality.

The battery pack 160 includes a battery 170, a charging/sourcing circuit (Charger B 268), and a level monitor 272. In some configurations, the level monitor 272 may be integrated with the charging circuit 268 as part of a power management integrated circuit (PMIC). The charging circuit 268 may be configured to operate the battery pack 160 in a boost (sourcing) mode, in which power is supplied by battery 170 to the device 110 for recharging device battery 120 or directly powering the device 110, a charge mode, in which power is received via the VBUS 254 to recharge the battery 170 (e.g., an active state charge mode) or the charging circuit 268 is waiting to receive power via the VBUS 254 (e.g., a stand-by state charge mode). The charging circuit 268 may further operate in a disconnect mode in which the battery 170 is electrically disconnected from VBUS 254 to prevent any voltage/current from leaking across the VBUS 254.

The electronic device 110 and the battery pack 160 may each be provided in any type of housing suitable for the device 110's intended use. For example, the housings of the device 110 and battery pack 160 may mechanically couple together to form an integrated unit, such as where the battery pack 160 is built into a "case" for the device 110. In such an arrangement, the housings of the electronic device 110 and the battery pack 160 may include features to permit the device 110 and pack 160 to be retained securely together when coupled, while being separable. This facilitates a user carrying just the electronic device 110 when the extended battery life provided by the battery pack 160 is not needed. Such coupling features may comprise magnets provided on or near the facing surfaces of the device 110 and battery pack 160 to provide a magnetic retaining force to securely maintain the coupling of the device 110 and battery pack 160. Alternatively or additionally, the coupling features may comprise mechanical latches, clamps, or other mechanical fasteners to provide the desired retaining force between the device 110 and battery pack 160. However, the housings of the device 110 and battery pack 160 need not be complementary/fastenable, such as where the battery pack 160 connects to the device via a cable.

In arrangements where the housings of the device 110 and battery pack 160 are fastenable to each other, the interfaces for the bus/connector 150 may comprise, among other things, five spring-loaded "pogo" pins and pin contacts which form electrical connections between the device 110 and the battery pack 160. The device 110 may include the pins and the battery pack 160 may include the pin contacts, or vice-versa. The coupling features may be used to maintain a secure electrical connection between the contacts and corresponding pins until the device 110 is separated from the battery pack 160. However, whether or not the device 110 and battery pack 160 are fastenable, other types of interfaces may be used for the bus/connector 150, such as, for example, corresponding cable receptacle ports (e.g., a USB connector), where the bus/connector 150 comprises an electrical cable bridging the interfaces.

In commercially available battery packs for recharging mobile phones, the battery pack is connected to the mobile phone via a USB interface on the battery pack to recharge the mobile phone. However, when the capacity of the battery pack is depleted, the battery pack must be disconnected from the mobile phone and connected to an AC power adapter through a separate power port. In other words, the path for recharging a conventional battery pack may be different than the path for utilizing the battery pack to charge the mobile device. In addition, in order to recharge the mobile phone using an AC power adapter, the battery pack must be disconnected from the mobile phone's power port (e.g., the phone's only micro-USB port) in order to connect the AC power adapter to the phone's power port. Accordingly, the process for utilizing these commercially available battery packs may be inconvenient.

In contrast, in the system 100, it is not necessary to disconnect the battery pack 160 from the electronic device 110 in order to recharge the battery 170 in the battery pack 160. The electronic device 110 has a separate power interface 212 (e.g., a USB port, an inductive coupling interface) for coupling (104) with an external power supply (charger 102) than the interface of bus/connector 150 for coupling with the battery pack 160. Therefore, a user may carry the device 110 connected to the battery pack 160 for normal ambulatory use, and when the user returns home, couple (104) the system 100 to a power charger 102 using a single cord or inductive coupling to recharge both the device battery 120 and the battery 170. This simplifies the operation of the system 100 for the user.

As noted in conjunction with FIG. 2, the system 100 may use features of the USB On-The-Go (OTG) specification, which provides an architecture for connecting USB devices without the need for a computer host. With USB-OTG, a device, such as a mobile phone, may switch between operating as the host and operating as the client when communicating with other USB devices connected to the mobile phone.

The charging circuit (Charger B 268) of the battery pack 160 may use, among other things, a switch-mode charge management solution to charge the battery 170, using a synchronous Pulse Width Modulation (PWM) controller, power MOSFETs, input current sensing, current and voltage regulation, and charge termination. Such charging circuits are sometimes integrated into a wafer-chip-scale (WCSP) package. The charging circuit 268 may be configured to operate in accordance with the USB OTG specification when connected to the device 110, such that the battery pack 160 can operate as the client to receive power from the device 110 to recharge the battery 170 or can operate as the host to supply power to the device 110 to recharge the device battery 120.

In order to avoid an accidental short circuit when the battery pack 160 is disconnected from the device 110, the Charger B 268 may be configured to maintain the battery 170 in a disconnect mode as its default state, in which the battery 170 is electrically disconnected from the VBUS line 254. As long as the battery pack 160 is disconnected from the electronic device 110, the Charger B 268 will maintain the battery 170 disconnected from the power bus (i.e., VBUS 254).

The VBUS line is selectively coupled to the input of the device's Charger A 218 via the Switch B 216. The Charger B 268 is coupled to the nOTG control line 256. The processor/controller 232 may the Control D signal 238 to indicate to the Charger B 268 the mode in which to operate. For example, to configure the Charger B 268 to support boost mode, the processor/controller 232 may set the Control D signal 238 to pull the nOTG control line 256 low, causing the Charger B 268 to connect the battery 170 to the power bus (VBUS line 254), so as to output electrical energy (e.g., a 5 V potential relative to the ground line 232) from the battery 170 via the power bus (VBUS 254) to recharge the device battery 120.

If there is a power charger 102 (shown in FIG. 1) connected to the power interface 212 of the device 110, then the power interface 212 will set the a state of a Status A signal 213 to indicate to the processor/controller 232 that electrical energy is being output from the power interface 212. In response, the processor 232 will set the state of Control Signal A 234 to close the Switch A 214, set the Control D signal 238 to pull the nOTG control line 256 to a high logic signal, and set the Control B signal 236 to close the Switch B 216 (if not already close). This high logic signal on the nOTG control line 256 is detected by the Charger B 268, causing the Charger B 268 to operate in charge mode, so that the battery 170 will be recharged using electrical energy from the charger 102 received via the VBUS 254.

The operations of Charger B 268 may be based on basic logic that configures the Charger B 268 in accordance with the control signal received via nOTG line 256 as set by the processor/controller 232 in the device 110. As such, the battery pack 160 does not necessarily need to include a processor. In particular, the steps of disconnecting the battery 170 from the power bus (VBUS 254), reconnecting the battery 170 when the voltage level on nOTG control line 256 indicates that the battery pack 160 is connected to the device 110, and switching between boost mode and charge mode, are all performed without the need for a microcontroller in the battery pack 160 or programmatic inputs from the device's processor 232 to the Charger B 268. This can be advantageous for situations in which the device battery 120 of the device 110 is completely depleted, such that the processor/controller 232 is incapable of generating any commands. By closing Switch B 216 as the default when the device 110 is not powered, once the battery pack 160 and the device 110 are connected, the battery pack 160 may immediately begin recharging the device 110, even when the device battery 120 is completely depleted and the device 110 is unpowered.

The controller/processor 232 provides programmable control and communication functions for the device 110. The controller/processor 232 may be implemented using any desired combination of hardware and software. For example, the controller/processor 232 may comprise a System on a Chip (SoC) processing unit configured to control operation of the device 110, as well as monitor the status of and communicate with the Charger B 268 via the I$^2$C data bus 257.

In some situations, it may be desirable to turn off the recharging of the device battery 120 using electrical energy from the battery pack 160 after the device battery 120 has reached a certain upper charge capacity or voltage threshold. The Level Monitor 222 determines the charge and/or voltage levels of the device battery 120, and may transmit this charge and/or voltage level to the Charger A 218 and/or the processor/controller 232. When the device battery 120 has reached the upper threshold, the processor/controller 232 may send an instruction over the I$^2$C data bus 257 to the Charger B 268 to command the Charger B to switch from boost mode to stand-by charge mode, thereby causing the battery pack 160 to stop charging the device 110 even though the device 110 remains connected to the battery pack 160. When the device battery 120 drops below the lower capacity charge or voltage threshold, the processor/controller 232 may send an instruction over the I$^2$C data bus 257 to the Charger B 268 to command the Charger B 268 to switch back to boost mode. With this configuration, the processor/controller 232 may be programmed to control the recharging operation of the device 110 by the battery pack 160 by issuing instructions over the data bus 257 to override the default operations of the Charger B 268.

The USB specification specifies a 500 mA maximum current draw permissible when a device initially connects to a USB power source. If it is desired to draw a larger current from the USB power source, the device must first negotiate with the USB power source to establish that a larger current is supported by the USB power source. If the charger 102 is a USB power source, then when the device 110 is connected to both the battery pack 160 and the power source 102, the processor/controller 232 may initially configure the system 100 to charge only the device battery 120 from the charger 102 and prevent the battery 170 from drawing electrical energy output by the power interface 212. For example, the processor/controller 232 may initially close Switch A 214, configuring the Charger A 218 to draw electrical energy output by the power interface 212, while opening Switch B 216. After the charger 102 is connected to the device 110, the processor/controller 232 may determine the maximum sourcing capability of the charger 102 using, for example, a standard protocol such as the USB BC1.2 standard. The processor/controller 232 may then calculate the difference between the current sourcing capability of the charger 102 and the current draw set by the Charger A 218 to determine whether the charger 102 is capable of providing additional current to charge the battery pack 160. If so, the processor/controller 232 may close Switch B 216 and communicate with the Charger B 268 via the I$^2$C data bus 257 to cause the Charger B 268 to enter into charge mode, thereby receiving electrical energy via the VBUS 254 to recharge the battery 170.

The processor/controller 232 may also be configured to query the Charger B 268 and/or the level monitor 272 via the I$^2$C data bus 257 to determine a status of the battery 170.

Such queries may be based on, among other things, reading status registers included in (or assigned/allocated to) the Charger B 268 and/or level monitor 272.

An advantage of the system 100 is that the electronic device 110 may utilize a small battery, reducing the weight and size of the device 110, while preserving the option to have additional battery capacity when desired. Moreover, both components of the modular system 100 can be easily recharged by simply coupling the electronic device 110 into a single power source (102) without having to separate the electronic device 110 from the battery pack 160. This configuration also eliminates the need to have a separate power port on the battery pack 160 for recharging the battery 170. The system 100 may also be include protective circuitry to isolate the exposed contacts from the batteries, thereby preventing accidental short circuits or user injury. Also, the reduction in interfaces needed for the battery pack 160 can simplify the design, thereby reducing manufacturing cost. This is particularly advantageous when designing the environmental protection features for the enclosure of the battery pack 160 by simplifying the process for sealing the battery pack 160 against dust and water intrusion.

Also, the battery pack 160 may be implemented without the need to include a programmable microcontroller in the battery pack 160. The operation of the battery pack 160 may be implemented using simple electronic components and commercially-available charging circuits. The charging characteristics for both the battery pack 160 and the electronic device 110 may be programmable by configuring the processor/controller 232 of the electronic device 110, such that it is unnecessary to independently reconfigure the battery pack 160 in order to update the charging characteristics.

The various switches (e.g., 214, 216, 219) may be solid-state switches and/or electromechanical switches (e.g., microelectromechanical systems (MEMS) relay switches). The terms "open" and "close" are used in relation to the states of the various switches. The origin of these terms in the art is mechanical switches and electro-mechanical relays: a pair of contacts is said to be "closed" when electrical current can flow from one to the other (a closed circuit), and is said to be "open" when the contacts are separated by a physical gap, such that no current can flow between contacts at normal voltages (an open circuit). Conceptually, the in-circuit operation of a solid-state switch is analogous to an electro-mechanical relay, even if the physical principles underlying their operation are entirely different. In the context of solid-state switches, "close" or "closed" refers a low-impedance state between terminals, allowing electrical current to flow, whereas "open" or "opened" refers to a high-impedance state between terminals, restricting the flow of electrical current. As known in the art, solid-state switches may allow negligible amounts of current to "leak" between terminals at normal voltages while in an "open" state, and exhibit an "on-state" resistance while in the a "closed" state. For the purpose of understanding the solid-state switches in the disclosed system, factors such as leakage current and on-state resistance are ignored, such that "open" or "opened" may be understood in the traditional way as corresponding to an open circuit that electrically disconnects the switch's terminals, and "close" or "closed" may be understood as corresponding to a closed circuit that electrically connects the switch's terminals.

Aspects of the disclosed system may be implemented as a computer method or as an article of manufacture such as a memory device or non-transitory computer readable storage medium. The computer readable storage medium may be readable by a computer and may comprise instructions for causing a battery-powered mobile device to perform processes described in the present disclosure. The computer readable storage medium may be implemented by a volatile computer memory, non-volatile computer memory, hard drive, solid-state memory, flash drive, removable disk and/or other media. In addition, components such as the processor/controller 232 may be implemented as an application specific integrated circuit (ASIC), as a field programmable gate array (FPGA), or some combination thereof. At least the charger circuit 218 and the level monitor 222 may be integrated as a power management integrated circuit (PMIC). Similarly, the charger circuit 268 and the level monitor 272 may be integrated as a PMIC, such as a PMIC compliant with the USB On-The-Go (OTG) specification.

Although the processor/controller 232 may be a general-purpose processor programmed to execute the various operations described herein using software stored in storage 234 and/or in firmware, the processor 232 may comprise a mix of operation-dedicated hardware components that are used in conjunction with the execution of software/firmware. If portions of the processor/controller 232 are embodied in dedicated hardware, the hardware may include circuits and/or a state machine. Such circuits may include, but are not limited to, discrete logic circuits comprising logic gates for implementing various logic functions upon an application of one or more input data signals, application specific integrated circuits (ASICs) having appropriate logic gates, or other components, etc.

Although the operations in FIGS. 1, 3, and 4, and otherwise described herein, may include a specific order of execution, the order of execution may differ from that which is described. Also, two or more operations or steps may be executed concurrently or with partial concurrence. Further, in some embodiments, one or more of the blocks or steps may be skipped or omitted.

The software or firmware code executed by the processor/controller 232 may be embodied in any non-transitory computer-readable medium, to be loaded into storage 234 and/or memory 233 for execution by the processor/controller 232. In this sense, the logic may comprise, for example, statements including instructions and declarations that can be fetched from the computer-readable medium and executed by the processor/controller 232. A "computer-readable medium" can be any medium that can contain, store, or maintain the logic and/or code to perform the operations described herein for use by or in connection with the processor/controller 232. The computer-readable medium can comprise any non-volatile physical media such as, for example, magnetic, optical, or semiconductor media. The memory 233 may include volatile random access memory (RAM), non-volatile read only memory (ROM), non-volatile magnetoresistive (MRAM) and/or other types of memory. The data storage component 234 may store data and controller/processor-executable instructions (e.g., instructions to perform the processes discussed in connection with FIGS. 1, 3, and 4). The data storage component 234 may include one or more non-volatile storage types such as magnetic storage, optical storage, solid-state storage, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of mobile computers and battery charge circuitry should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

As used in this disclosure, the term "a" or "one" may include one or more items unless specifically stated otherwise. Further, the phrase "based on" is intended to mean "based at least in part on" unless specifically stated otherwise.

What is claimed is:

1. A system comprising a first device and a second device, wherein:
   the second device comprises:
   a battery,
   a level detection circuit configured to determine a voltage level of the battery, and
   an electrical connector configured to connect the second device to the first device; and
   the first device comprises a controller configured to:
   receive, from the second device, the voltage level of the battery,
   determine that the voltage level is above a first threshold,
   determine, after determining that the voltage level is above the first threshold, that the second device is authorized for use with the first device,
   determine that the voltage level is below a second threshold,
   output a first notification via a user interface to plug a power charger into the first device,
   cause electrical energy from the power charger to be directed to the electrical connector, and
   configure the second device to charge the battery using the electrical energy.

2. The system of claim 1, wherein the controller is further configured to:
   determine a first operational status of the level detection circuit of the second device, after determining that the voltage level is above the first threshold and prior to determining that the second device is authorized for use.

3. The system of claim 2, wherein the controller is further configured to:
   count a number of communication retries required to determine at least the first operational status; and
   output a second notification via the user interface indicating that there is a fault in the electrical connector based on the number exceeding a maximum limit value.

4. The system of claim 3, wherein the second device further comprises:
   a charger circuit configured to selectively charge the battery using electrical energy received via the electrical connector, and to output electrical energy from the battery to the electrical connector,
   wherein the controller is further configured to determine a second operational status of the charger circuit while the power charger is connected, and the number of communication retries counted by the controller further includes retries required to determine the second operational status.

5. The system of claim 2, wherein the second device further comprises:
   a charger circuit configured to selectively charge the battery using electrical energy received via the electrical connector, and to output electrical energy from the battery to the electrical connector,
   wherein the second threshold is greater than or equal to a larger of a minimum operating voltage of the charger circuit and the minimum operating voltage of the level detection circuit.

6. The system of claim 1, wherein the controller is further configured to:
   cause, after the controller determines that the second device is authorized, electrical energy from the battery to be directed via the electrical connector to the first device.

7. The system of claim 1, wherein the controller is further configured to:
   receive, after determining that the second device is authorized, at least one parameter from the second device relating to operation of the battery, the at least one parameter including one or more of: temperature, a last measured charge, a nominal charge available, or a state of charge.

8. The system of claim 1, wherein the controller is further configured to:
   determine, prior to determining that the voltage level is above the first threshold, that the second device is electrically connected to the first device.

9. The system of claim 8, wherein:
   the electrical connector comprises a ground line, a power line, and a serial data line;
   the second device further comprises a first resistor connecting the serial data line to the ground line; and
   the first device further comprises a second resistor connecting the serial data line to a voltage source,
   wherein the controller is further configured to determine that the second device and the first device are connected based on the first resistor causing a voltage on the first resistor to be less than that of the voltage source.

10. The system of claim 1, wherein the controller is further configured to:
    receive, from the second device, first data representing the voltage level of the battery;
    receive, from the second device, second data representing a device identifier associated with the second device;
    determine that the voltage level is above the first threshold by evaluating the first data; and
    determine that the second device is authorized for use with the first device by evaluating the second data.

* * * * *